United States Patent

Yasumoto

[11] Patent Number: 5,760,295
[45] Date of Patent: Jun. 2, 1998

[54] METHOD FOR INSPECTING SEALED PACKAGE

[75] Inventor: Kenji Yasumoto, Toyonaka, Japan

[73] Assignee: Joven Denki Kabushiki Kaisha, Osaka, Japan

[21] Appl. No.: 746,091

[22] Filed: Nov. 6, 1996

[51] Int. Cl.$^6$ .................................................. G01M 3/40
[52] U.S. Cl. .................................................. 73/49.3
[58] Field of Search ........................ 73/45.5, 49.3, 73/52; 324/663

[56] References Cited

U.S. PATENT DOCUMENTS

| | | | |
|---|---|---|---|
| 3,855,531 | 12/1974 | Fielibert et al. | 73/52 |
| 4,135,384 | 1/1979 | Burwell, Jr. et al. | 73/49.3 X |
| 4,243,932 | 1/1981 | Kakumoto et al. | 73/52 X |
| 4,803,868 | 2/1989 | Vinton et al. | 73/49.3 |
| 5,535,618 | 7/1996 | Konieczka | 73/49.3 |

FOREIGN PATENT DOCUMENTS

| | | | |
|---|---|---|---|
| 0195140 | 11/1984 | Japan | 73/49.3 |

Primary Examiner—Michael Brock
Attorney, Agent, or Firm—Koda & Androlia

[57] ABSTRACT

A method for inspecting a sealed package, wherein whether the sealed package has any pinholes or not can be efficiently determined without damaging the sealed package packaged with electrically insulating films and without any dangers caused by a voltage applied to electrodes in the inspection. A sealed package 3 in which electrically conductive contents 1 such as fluid are wrapped with electrically insulating films 2 is sandwiched between a pair of electrode plates $4_1$, $4_2$ facing each other, which are connected with a capacitance meter 10. An end portion 3a to be inspected which is most liable to have pinholes in the sealed package 3 is immersed in salt water (one percent sodium chloride solution) 5 with which a stainless tank 6 connected with one electrode plate $4_2$ of the pair is filled, and the capacitance between both the electrode plates $4_1$, $4_2$ is measured. The measurement is compared with the measurement for a sealed package 3 which has no pinholes to determine whether the inspected sealed package has any pinholes or not, based on the change of the measurement.

8 Claims, 4 Drawing Sheets

METHOD FOR INSPECTING SEALED PACKAGE

BACKGROUND OF THE INVENTION

1. Field of the Invention

The present invention relates to a method for inspecting completely sealed packages which contain food, medical expendables, or the like, for pinholes.

2. Description of the Prior Art

Recently, seal-packaging has been applied to many products including foods and medical expendables such as physiological salt solution, in order to maintain the aseptic condition of the contents. Inspecting the sealed package for pinholes is significantly important because, in the case of food, a pinhole could cause the contents of the package to deteriorate or rot due to the contact with the ambient air and because, in the case of medical expendables, e.g. bottles for transfusion, a pinhole could cause the contamination or deterioration. A conventional method for inspecting for pinholes, in which method electrodes are inhibited from entering the sealed package, has been carried out through the steps of: in the case of food, sticking a metal pin into the completed package, where the metal pin is used as one electrode, which is the counter electrode to an external electrode provided in contact with the package, applying a high voltage between both electrodes to inspect for pinholes, and after the inspection, sealing the bore made by the metal pin in a separate process. This method, however, has defects that the process of inspection is complicated and that the subsequent process of sealing the bore is required. A method which allows the pinhole inspection to be achieved without damaging a completed package and thus which solves the defects is disclosed, for example, in Japanese Patent Publication No. SHO 50-6998, wherein a food product is put between a pair of electrodes, and a voltage is applied between both electrodes with capacitances much differing between each electrode and the food, so that any pinholes can be detected by detecting a flashover between one electrode and the food.

SUMMARY OF THE INVENTION

As mentioned above, the method for inspecting for pinholes by putting a package of food between a pair of electrodes has unavoidably involved danger because a voltage applied between both electrodes requires a magnitude which is sufficient to cause a flashover through any pinholes between one electrode and the food. Besides, because any pinholes are found by detecting a current caused by the flashover, the method would cause the material of the food to change in quality due to the electric discharge. Thus, in the case that any pinholes have existed, the packaged food which has been inspected by the method would have partially deteriorated in quality or otherwise it would be impossible to recycle the contents even in the case where they could be recycled unless they have deteriorated in quality.

The invention, which has been accomplished in view of the facts mentioned above, is intended to provide a method for inspecting a sealed package, wherein whether the sealed package has any pinholes or not can be efficiently determined without involving any danger due to the voltage applied to the electrodes, without causing any change in quality of the inspected contents due to the electric discharge, and without demanding the completed sealed package.

In this case, examples of the sealed packages to be inspected are foods which primarily include cylindrical packages in which sausages are sealed and packed one by one, and retort-packed foods in flat bags made of plastic films; some medical expendables, which are to be inspected to prevent any contamination and deterioration of the contents due to the contact with the ambient air via pinholes, including infusion solutions such as physiological salt solution and Ringer solution in transfusion bottles made of thin plastics, and blood formations such as transfusion blood and blood plasma in thin plastic bags; and others.

In order to achieve the above-mentioned object, in the method for inspecting a sealed package according to the invention, a sealed package 3 in which electrically conductive contents 1 such as food and fluid are packed in electrically insulating films 2 is sandwiched between a pair of electrode plates $4_1$, $4_2$ facing each other, while an end portion 3a to be inspected which is most liable to have pinholes in the sealed package 3 is brought into contact with a current-carrying member 5 connected with one of the pair of electrode plates, so that the capacitance between the electrode plates $4_1$, $4_2$ facing each other is measured to detect any pinholes of the sealed package 3.

With such an arrangement, in the case that the end portion 3a to be inspected of the sealed package has any pinholes, current can flow between the contents 1 of the sealed package 3 and one of the electrode plates through the current-carrying member 5 brought into contact with the contents.

In the case that the end portion 3a to be inspected has no pinholes, the capacitance between the pair of the electrode plates $4_1$, $4_2$ facing each other is obtained by making the capacitances at two locations, i.e., the. capacitances between each electrode plate and the conductive food or fluid 1, in series.

When the end portion 3a to be inspected has any pinholes, there occurs electrical continuity between liquid or liquid components in the contents 1 which have exuded into the pinholes and one of the electrodes via the current-carrying member 5, in which case the capacitance between both the electrode plates $4_1$, $4_2$ is one across a sheet of the electrically insulating film 2, the capacitance varying from the above-mentioned capacitance made in series to be a large one. That is, by measuring the capacitance between both the electrode plates $4_1$, $4_2$, which has varied from the capacitance which is determined by the size of the electrode plates, the thickness of the electrically insulating film 2, and others without any pinholes, the existence or nonexistence of any pinholes at the end portion 3a to be inspected which is most liable to have pinholes can be detected immediately so that the sealed packages can be inspected efficiently.

As the current-carrying member 5, it is advantageous to use conductive liquid such as water and salt water. In the case of salt water, one percent sodium chloride solution is preferable. Such liquid can be brought into complete contact even with the surface of the end portion 3a to be inspected which is amorphous, in order to obtain conduction.

As the current-carrying member 5, it is also possible to use conductive rubber which has been formed so as to be in intimate contact with the end portion 3a to be inspected. That is, in the case that the end portion 3a to be inspected is a mass-produced molding, the portion 3a always has a constant form, so that the current-carrying member 5 can be brought into intimate contact with the surface of the end portion to be inspected, to obtain conduction, by taking advantage of the elasticity of the conductive rubber.

In the case that the electrically insulating film 2 in which the contents 1 are packed has any pinholes and, depending upon the type of the contents 1 of the sealed package 3, it is difficult to pass current between the contents 1 as it is and the current-carrying member 5 such as conductive liquid through the pinholes, the capacitance is preferably measured by sandwiching the sealed package 3 between the electrode plates $4_1$, $4_2$ with pressurization so that the contents or liquid components thereof can exude through the pinholes in the end portion 3a to be inspected. With such a method, electrical continuity can be easily obtained between the contents 1 and one electrode plate in order to detect the pinholes of the sealed package 3.

As the end portion 3a to be inspected of the sealed package 3 to be immersed in the conductive liquid 5, a tightly tied portion of the opening of the bag in which the contents 1 are sealed with the electrically insulating films 2 can be used. Typically, the insulating film 2 at this portion is liable to have pinholes because tightly tying causes too much internal stress in the film, so that the inspection for pinholes can be effectively accomplished.

As is frequently seen in retort-packed foods, in the sealed package 3 using composite plastic films as the electrically insulating films 2 in which the contents 1 are wrapped, a thermally sealed portion 3a of the bag made of the plastic films can be used as the end portion 3a to be inspected of the sealed package 3. Typically, because the portion is sealed by heating and fusing, the portion is liable to have pinholes due to tiny bubbles caused by the heating, and can be effectively inspected for pinholes.

DETAILED DESCRIPTION OF THE PREFERRED EMBODIMENTS

Figure 1:
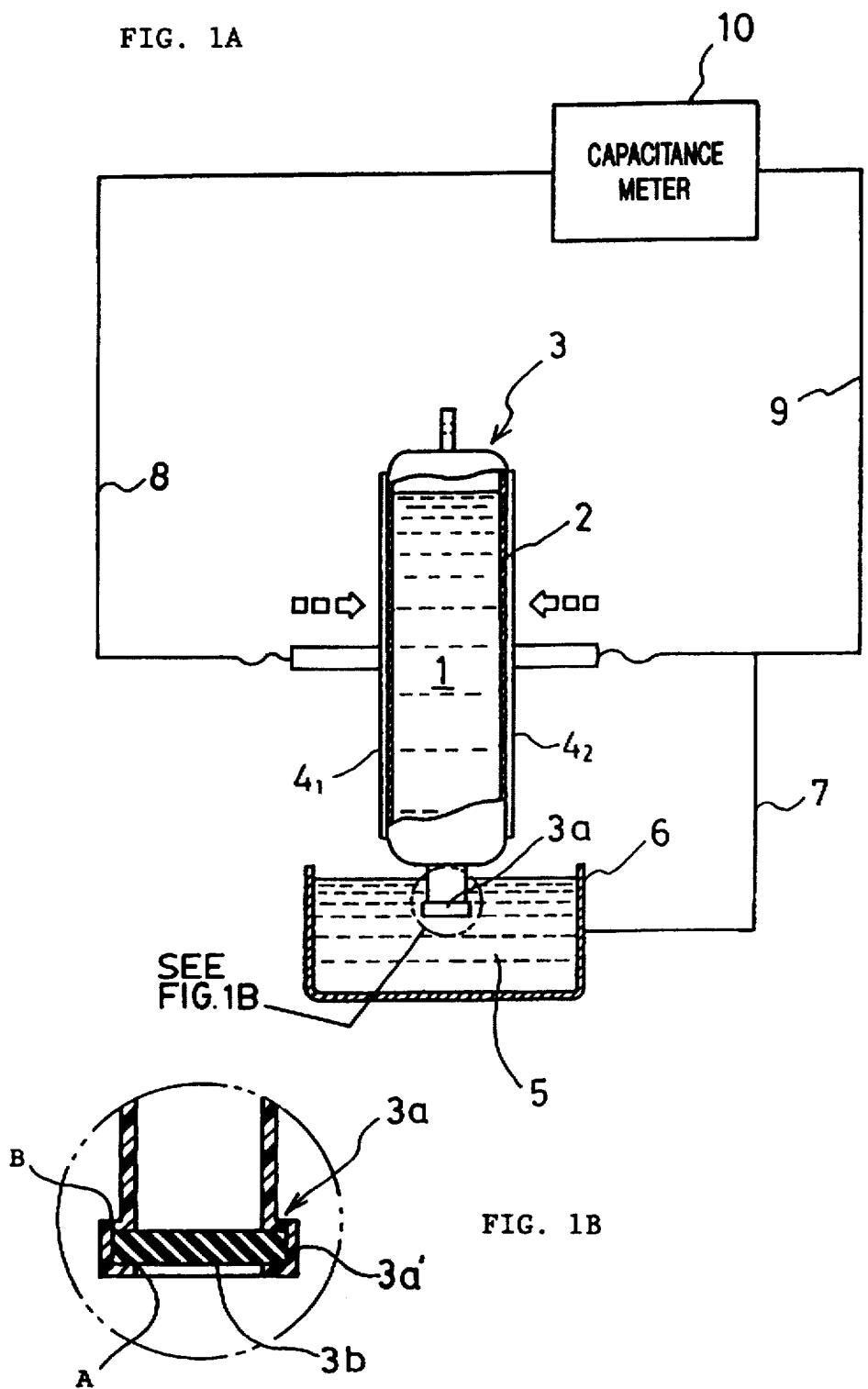
FIG. 1 is an arrangement view of a method for inspecting sealed packages in accordance with the invention, in the case that the package is a bottle for transfusion such as physiological salt solution.

In the present invention, as the electrically insulating films 2 in which the contents 1 of the sealed package 3 to be inspected are packed, plastic films matching the contents are used.

That is, in the case that the content 1 is, for example, fish sausage, a bag made of vinylidene chloride films is used, which bag is filled with mince of fish sausage and then clipped with aluminum wires at both ends, and after that, retort-sterilization is effected. Retort-packed food which employs a composite film (laminate film) bag of which inner layers contain no aluminum foil can be included in the sealed packages to be inspected. In this case, the bag made of composite films of nylon and polypropylene, polyester and polypropylene, or polyester and vinylidene chloride and polypropylene is employed. On the other hand, in the case of transfusion such as physiological salt solution and Ringer solution, a transfusion bottle made of thin plastics the type of which has been predetermined respectively is used.

A pair of electrode plates $4_1$, $4_2$ facing each other for sandwiching the sealed package 3 packaged as mentioned above are formed into the shapes which correspond to the sealed package 3 to be inspected. One electrode plate $4_2$ is electrically connected with the conductive liquid 5 such as water or salt water, with which a liquid tank 6 is filled up to a predetermined water level, or the plate $4_2$ is connected with electrically conductive rubber parts $5_1$, $5_2$, . . . which have been formed so as to come into intimate contact with the end portion 3a to be inspected. Then, the pair of electrode plates $4_1$, $4_2$ are connected with measuring terminals of a predetermined type of capacitance meter 10, respectively.

In inspecting the sealed package 3, with the end portion 3a to be inspected of the sealed package immersed in the conductive liquid 5 or brought into intimate contact with the conductive rubber parts $5_1$, $5_2$, . . . as the current-carrying members, the measuring switch of the capacitance meter 10 is turned on to measure the capacitance, which is then compared with the capacitance in the case that there are no pinholes. Thus, any pinholes are detected.

EXAMPLES

Example 1

FIG. 1 illustrates a case where the sealed package 3 was a drip transfusion bottle in which physiological salt solution was sealed. The transfusion bottle 3 had a body portion formed of somewhat thick plastic film 2, with a 65 mm×90 mm cross section and a 240 mm high rectangular section having rounded corners, and the bottle had a capacity of 1000 milliliters. The end portion 3a to be inspected which is liable to have pinholes had a rubber stopper portion 3b to be needled for drip transfusion disposed airtight on the opening of the stepped end portion having an outside diameter of 28 mm and a thickness of 8 mm, with a suspension ring disposed on the opposite side. The conductive-liquid tank 6 made of stainless steel with predetermined dimensions was filled with salt water (preferably, one percent sodium chloride solution) 5 used as the conductive liquid 5 in which the end portion 3a to be inspected of the sealed package 3 was to be immersed, up to a predetermined water level.

The sealed package 3 was sandwiched by the electrode plates $4_1$, $4_2$ having a width of 100 mm and a height of 240 mm, which were connected with the measuring terminals of the digital capacitance meter 10 through lead wires 8, 9, with one electrode plate $4_2$ electrically connected with the conductive-liquid tank 6 through lead wire 7. As a result of the measurement of capacitance C between both the electrodes, in the case that neither pinholes nor liquid leakage existed, the capacitance C was 17 PF (picofarads), while in the case that the transfusion bottle 3 was presumed to have any pinholes or leakage due to the pinholes, the capacitance C was found to increase to 170 PF (in testing, a commercially available capacitance meter was used with a frequency of 10 kHz).

In this case, the end portion 3a to be inspected was found to have pinholes or leakage from openings corresponding to the pinholes at a portion A which was a boundary line between the rubber stopper portion 3b to be needled for drip transfusion and the opening of the end portion to be inspected, and at a portion B which was the base of a frame 3a' for holding the rubber stopper portion.

Because the end portion 3a to be inspected of the transfusion bottle 3 is formed so that the configuration has constant dimensions, conductive rubber that is so formed as to come into intimate contact with the outer surface of the end portion $3a$ to be inspected can be used instead of the conductive liquid 5 as the current-carrying member when such a type of products is inspected.

Figure 2:
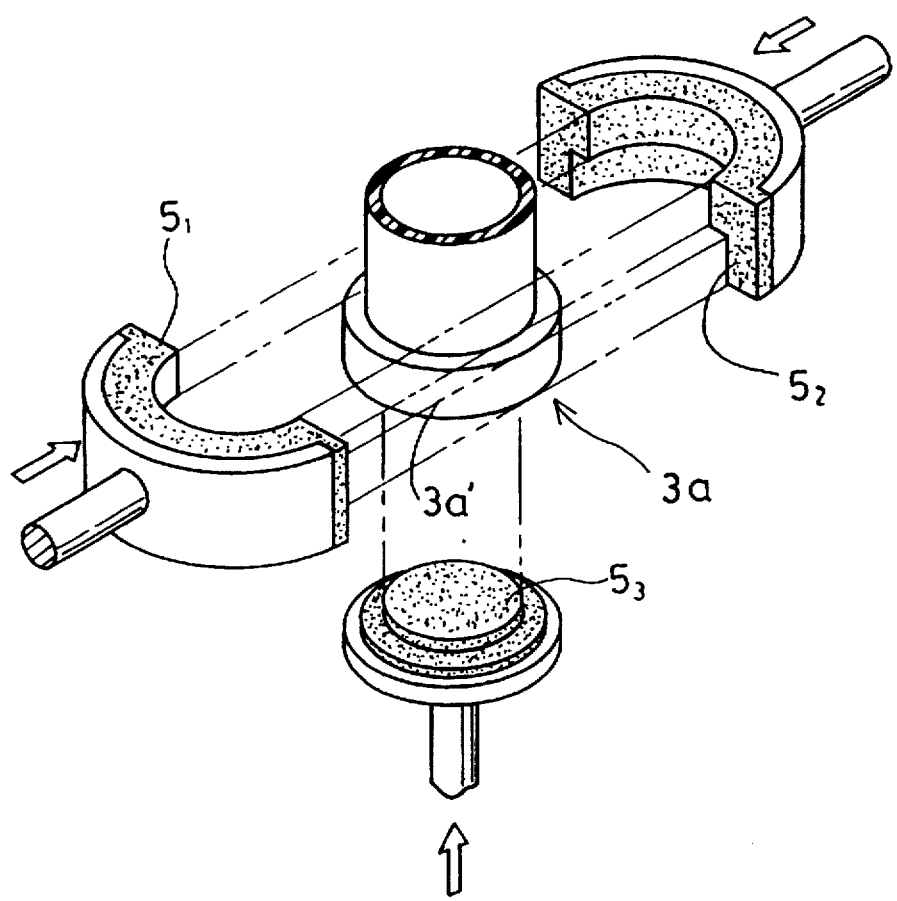
FIG. 2 is a perspective view in which the conductive rubber parts are brought into intimate contact with an end portion to be inspected.

FIG. 2 is a perspective view of the current-carrying members for the end portion. $3a$ to be inspected which are made of conductive rubber. The conductive rubber parts $5_1$, $5_2$, $5_3$ have been formed so as to come into intimate contact with the outer surface of the end portion $3a$ to be inspected at the opposite lateral sides and lower side of the frame $3a'$ for holding the rubber stopper portion of the end portion $3a$ to be inspected, and have been mounted to a metallic base. By bringing the conductive rubber parts $5_1$, $5_2$, $5_3$ into intimate contact with the end portion $3a$ to be inspected and by electrically connecting each conductive rubber part $5_1$, $5_2$, $5_3$ with the electrode plate $4_2$, the inspection for pinholes or leakage can be done without using liquid and the sealed package 3 can be inspected advantageously with no need for wetting the object to be inspected.

Example 2

Figure 3:
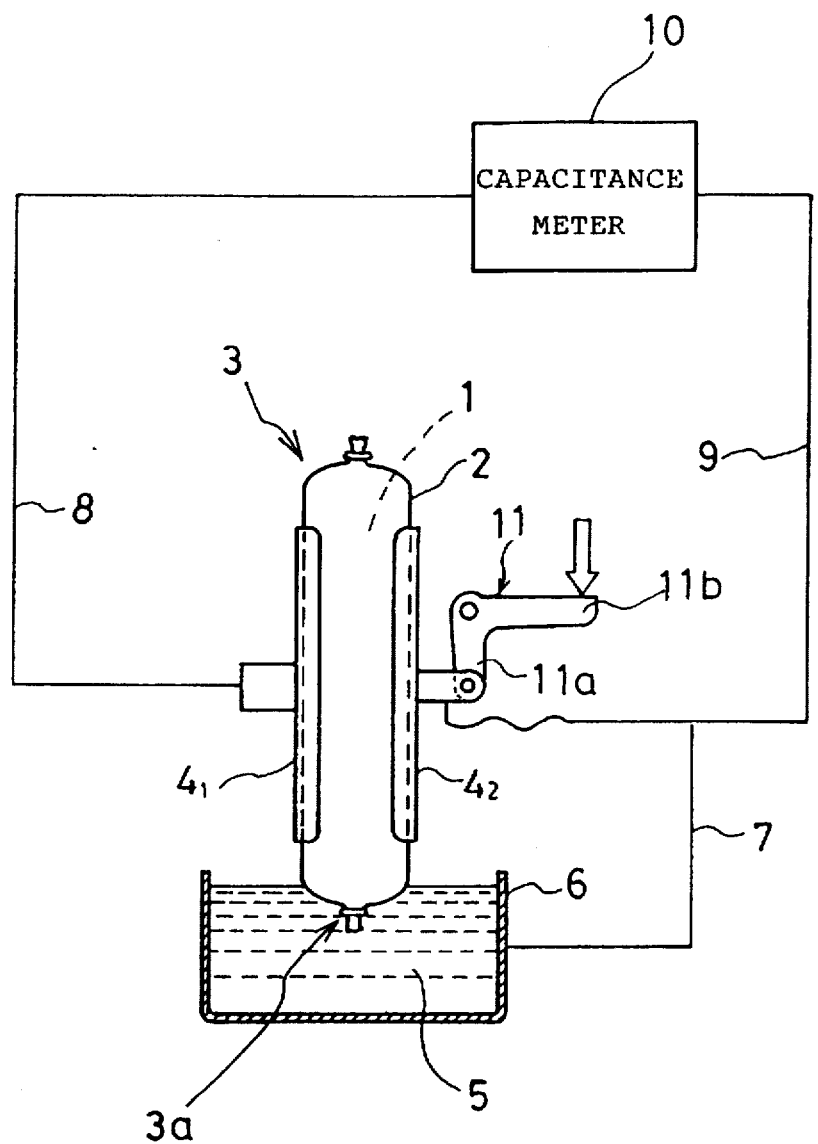
FIG. 3 is an arrangement view of a method for inspecting sealed packages in accordance with the invention, in the case that the package is sandwiched and pressurized for the inspection.

FIG. 3 illustrates a case where the end portion $3a$ to be inspected of the sealed package 3 is a tightly tied portion of the bag in which the contents 1 are sealed with the electrically insulating film 2.

The content 1 is, for example, a sort of fish sausage. As the electrically insulating film 2, simple film of vinylidene chloride is used because of its transparency and superior ability for shrinking and barriering. The ends of the bag filled with the contents are tightly tied with aluminum wires. The electrode plates $4_1$, $4_2$ sandwiching the bag have predetermined shapes with arc-like inside surfaces corresponding to the object of inspection. The end portion $3a$ to be inspected which is tied tightly is immersed in water 5 as the conductive liquid in the conductive-liquid tank 6 in the same way as in Example 1. The central back portion of one electrode plate $4_2$ is connected with an end portion of a shorter arm $11a$ of a crank lever 11 so that the sealed package 3 can be pressurized between the plate $4_2$ and the opposite electrode plate $4_1$. By pressing an end portion of the longer arm $11b$ downwardly, the sealed package 3 can be pressurized between both the electrode plates $4_1$, $4_2$. The connections between the electrode plates, the conductive-liquid tank, and others are the same as in the foregoing Example.

When the sealed package 3 such as fish sausage is inspected, the sealed package 3 is sandwiched between both the electrode plates $4_1$, $4_2$, and pressurized at both sides by pressing down the end portion of the arm $11b$ of the crank lever 11.

Thus, in the case that the contents 1 are not liquid but something like fish sausage, a little amount of water contained in the contents is squeezed out toward the end portion $3a$ to be inspected which is liable to have pinholes, and electrical continuity would occur between the water and outside water 5 via pinholes, if any. In this case, the capacitance C between both the electrode plates $4_1$, $4_2$ has a much larger value than in the case that there are no pinholes, so that whether any pinholes exist or not in the sealed package 3 to be inspected can be detected.

Example 3

Figure 4:
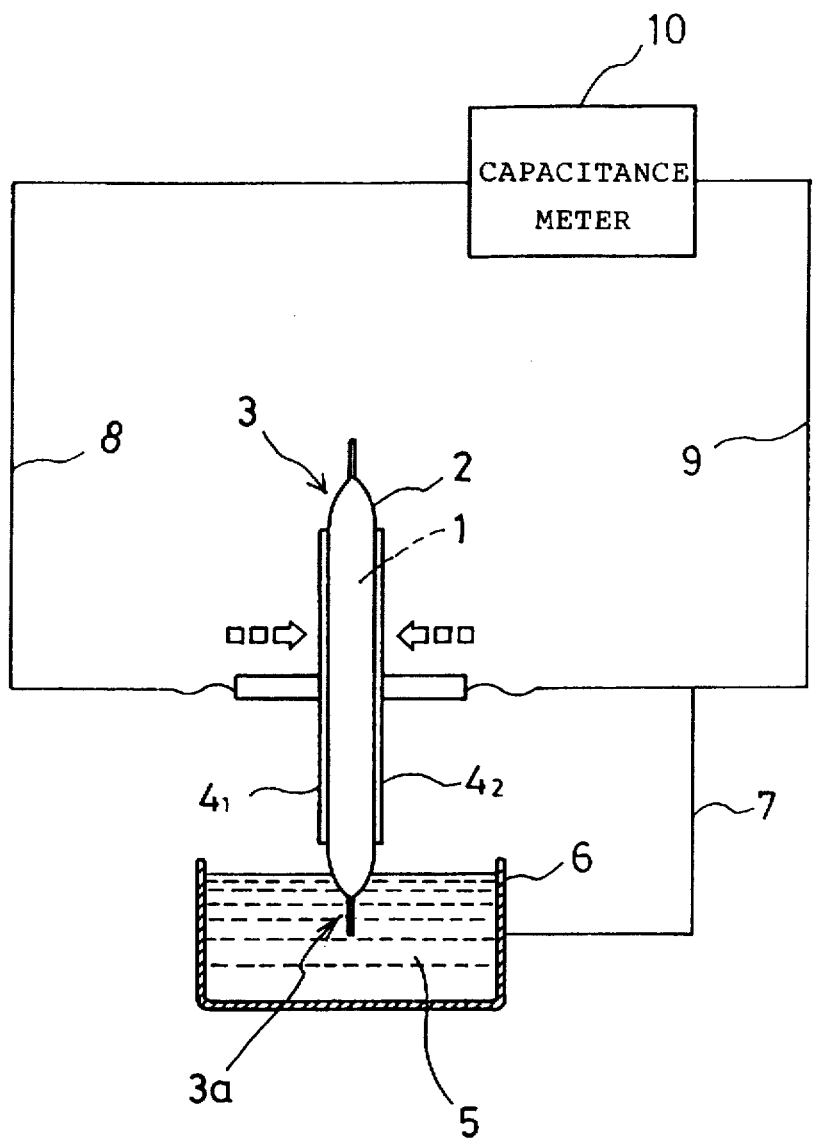
FIG. 4 is an arrangement view of a method for inspecting sealed packages in accordance with the invention, in the case that the package is a food product packed in a thermally sealed bag such as retort-packed foods.

FIG. 4 illustrates a case where the sealed package 3 such as retort-packed food is inspected in which the end portion $3a$ to be inspected is a thermally sealed portion of the bag made of plastic films.

The content 1 is bagged food such as retort-packed food, and the electrically insulating film 2 is implemented by a composite plastic film (laminate film). The capacitance between both the electrode plates $4_1$, $4_2$ is measured with the package sandwiched between the flat electrode plates $4_1$, $4_2$ the size of which corresponds to that of the object to be inspected, and with the end portion $3a$ to be inspected, which is the thermally sealed portion, immersed in salt water or water in the same manner as in the examples described above. In the case that the thermally sealed portion $3a$ has any pinholes, electrical continuity occurs between the contents 1 and outside salt water or water 5 via the pinholes, and the capacitance C between both the electrode plates $4_1$, $4_2$ obtains a much larger value than in the case that there are no pinholes, so that whether any pinholes exist or not in the sealed package 3 to be inspected can be detected.

In each example described above, it is also possible to similarly detect even any pinholes in the electrically insulating films 2 of the sealed package 3 which are in intimate contact with both the electrode plates $4_1$, $4_2$, because of the change in the capacitance.

The method for inspecting sealed packages in accordance with the invention can be similarly applied to injections, ampuls of liquid medicines, and others, for example, tooth paste in plastic tubes, in addition to the examples described above. For instance, with the body portion of an ampul or the like sandwiched between electrode plates facing each other, and with the tip portion (including the neck portion) of the ampul immersed in electrically conductive liquid, any pinholes of the ampul or the like can be inspected by observing an amount of the change of the capacitance between both the electrodes which is measured in the same manner as described above. Thus, various types of sealed packages can be inspected without departing from the purport of the method of the invention.

In accordance with the method for inspecting sealed packages of the invention, in the inspection for pinholes of a sealed package where the contents such as electrically conductive food and fluid are packed in the electrically insulating films, the portion to be inspected which is most liable to have pinholes can be inspected without using a relatively high voltage only by measuring the capacitance between the electrode plates sandwiching the object to be inspected. Accordingly, whether the sealed package has any pinholes or not can be inspected efficiently and easily without any dangers, without causing any changes in quality of the inspected contents, and without damaging the completed sealed package.

In accordance with the invention, even in the case that the shape of the end portion to be inspected which is most liable to have pinholes in the sealed package is amorphous, conductive liquid such as water or salt water can be completely brought into intimate contact with the end portion to be inspected to obtain conduction in the case that any pinholes exist. Thus, the sealed package can be easily inspected.

In accordance with the invention, in the case that a mass-produced molding is used as the end portion to be inspected which is most liable to have pinholes in the sealed package, conductive rubber can be brought into intimate contact with the end portion to be inspected, by taking advantage of the elasticity of the rubber, to obtain conduction In the case that any pinholes exist. Thus, the sealed package can be inspected without wetting the portion to be inspected.

In accordance with the invention, in the case that, depending on the type of the contents of the sealed package, it is difficult to obtain electrical continuity between the contents, as it stands, and the outside current-carrying member via any pinholes, the contents or the liquid components can be made easy to exude through the pinholes so that continuity between the contents and the outside current-carrying member can be easily obtained. Thus, the sealed package can be easily inspected.

In accordance with the invention, in the inspection of the sealed package, by inspecting a tightly tied portion or thermally sealed portion of the bag which is most liable to have pinholes, the efficient inspection of the sealed package can be implemented.

What is claimed is:

1. A method for inspecting a sealed package, the method comprising: sandwiching the sealed package (3) in which electrically conductive contents (1) such as food and fluid are wrapped with electrically insulating films (2), between a pair of electrode plates ($4_1$, $4_2$) facing each other; bringing an end portion (3a) to be inspected of the sealed package (3) into contact with a current-carrying member (5) electrically connected with one of the pair of electrode plates; and detecting any pinholes of the sealed package (3) by measuring a capacitance between the electrode plates ($4_1$, $4_2$) facing each other.

2. A method for inspecting a sealed package as claimed in claim 1, wherein the current-carrying member (5) is electrically conductive liquid such as water or salt water.

3. A method for inspecting a sealed package as claimed in claims 1 or 2, wherein the capacitance is measured by pressing the sealed package sandwiched between the electrode plates ($4_1$, $4_2$) so that the contents or liquid contents thereof can exude through any pinholes of the end portions (3a) to be inspected.

4. A method for inspecting a sealed package as claimed in claim 3, wherein the end portion (3a) to be inspected of the sealed package (3) is a tightly tied portion of a bag in which the contents (1) are sealed with the electrically insulating films (2).

5. A method for inspecting a sealed package as claimed in claim 3, wherein the electrically insulating films (2) are plastic films and wherein the end portion (3a) to be inspected of the sealed package (3) is a thermally sealed portion of a bag made of the plastic films.

6. A method for inspecting a sealed package as claimed in any of claims 1 and 2, wherein the end portion (3a) to be inspected of the sealed package (3) is a tightly tied portion of a bag in which the contents (1) are sealed with the electrically insulating films (2).

7. A method for inspecting a sealed package as claimed in any of claims 1 and 2, wherein the electrically insulating films (2) are plastic films and wherein the end portion (3a) to be inspected of the sealed package (3) is a thermally sealed portion of a bag made of the plastic films.

8. A method for inspecting a sealed package as claimed in claim 1, wherein the current-carrying member (5) is electrically conductive rubber formed so as to come into intimate contact with the end portion (3a) to be inspected.

* * * * *